(12) United States Patent
Hock et al.

(10) Patent No.: US 7,854,436 B2
(45) Date of Patent: Dec. 21, 2010

(54) AXLE LIFTING DEVICE FOR A VEHICLE

(75) Inventors: Helmut Hock, Bessenbach (DE);
Harald Panke, Bessenbach (DE)

(73) Assignee: SAF-Holland, GmbH, Bessenbach (DE)

(*) Notice: Subject to any disclaimer, the term of this patent is extended or adjusted under 35 U.S.C. 154(b) by 280 days.

(21) Appl. No.: 11/813,715

(22) PCT Filed: Jan. 11, 2007

(86) PCT No.: PCT/EP2007/000217

§ 371 (c)(1),
(2), (4) Date: Jan. 22, 2008

(87) PCT Pub. No.: WO2007/082679

PCT Pub. Date: Jul. 26, 2007

(65) Prior Publication Data

US 2009/0283980 A1 Nov. 19, 2009

(30) Foreign Application Priority Data

Jan. 13, 2006 (DE) .................. 10 2006 001 839

(51) Int. Cl.
*B62D 61/12* (2006.01)

(52) U.S. Cl. .............. 280/86.5; 280/124.116; 280/124.128; 280/124.153; 280/414.5

(58) Field of Classification Search .......... 280/124.116, 280/124.128, 124.153, 414.5, 6.153
See application file for complete search history.

(56) References Cited

U.S. PATENT DOCUMENTS

| | | | | |
|---|---|---|---|---|
| 5,505,418 A | * | 4/1996 | Corcoran | ............... 248/254 |
| 5,655,788 A | | 8/1997 | Peaker | |
| 6,007,078 A | * | 12/1999 | Gottschalk et al. | ..... 280/86.751 |
| 6,062,578 A | * | 5/2000 | Richardson | ............... 280/81.6 |
| 6,073,947 A | * | 6/2000 | Gottschalk et al. | .... 280/124.128 |
| 6,293,570 B1 | * | 9/2001 | Gottschalk et al. | ..... 280/86.751 |
| 6,322,089 B1 | * | 11/2001 | Dantele et al. | ........ 280/124.128 |
| 6,416,069 B1 | * | 7/2002 | Ramsey | ............... 280/124.116 |
| 6,796,566 B2 | * | 9/2004 | VanDenberg | .............. 280/86.5 |
| 6,880,839 B2 | * | 4/2005 | Keeler et al. | ............... 280/86.5 |
| 7,434,821 B2 | * | 10/2008 | Hinz | ......................... 280/86.5 |

FOREIGN PATENT DOCUMENTS

| | | |
|---|---|---|
| DE | 203 17 350 U1 | 3/2004 |
| EP | 0 836 984 A1 | 4/1998 |

(Continued)

*Primary Examiner*—Toan C To
(74) *Attorney, Agent, or Firm*—Price, Heneveld, Cooper, Dewitt & Litton, LLP (57) ABSTRACT

Axle lifting device for a vehicle, in particular for vehicle axles with pneumatic suspension, comprising a supporting element, a lifting element, and a lever element, the supporting element and the lever element being connectable to one another via the lifting element such that when the lifting element is actuated, the supporting element is supported on a frame element of the vehicle and the lever element exerts a preferably vertical force on an axle control arm of the vehicle in order to lift the axle control arm, and the lever element is mounted essentially in a stationary manner so as to be rotatable or pivotable with respect to a distal end of the axle control arm and/or the frame element, and the supporting element is rotatably or pivotably supported on the lever element.

13 Claims, 4 Drawing Sheets

FOREIGN PATENT DOCUMENTS

| | | |
|---|---|---|
| EP | 0 941 915 A1 | 9/1999 |
| EP | 1 332 954 A1 | 8/2003 |
| EP | 1 661 739 A1 | 5/2006 |
| WO | WO 98/38074 A1 | 9/1998 |
| WO | WO 01/12495 A1 | 2/2001 |

* cited by examiner

AXLE LIFTING DEVICE FOR A VEHICLE

The present invention relates to an axle lifting device for a vehicle, in particular for a vehicle axle with pneumatic suspension, and a wheel suspension for a vehicle, in particular for a utility vehicle.

Axle lifting devices of this type are known from the prior art. These axle lifting devices are designed such that the axle to be lifted is supported by two parallel guide or longitudinal control arms, each of the guide control arms preferably being pneumatically suspended on the vehicle chassis and also being pivotably mounted or supported on the body via an articulated axis. An axle lifting device is typically provided on each guide control arm which likewise may be centrally positioned between two longitudinal control arms via a connecting element. DE 203 17 350 U1, for example, discloses an axle lifting device which may be retrofitted by simply supporting same on abutments. This axle lifting device has a lifting element which is situated on a support apparatus and which is supported or attached to the frame at that location. When the lifting element is actuated, a portion of the lifting element presses against and moves the guide control arm.

A problem with such devices, however, is that they are only able to lift axles up to a certain weight, since a larger size for the axle lifting device is neither possible nor desirable.

In light of the foregoing, the object of the present invention is to provide an axle lifting device for a vehicle, in particular for vehicle axles with pneumatic suspension, and a wheel suspension for a vehicle, in particular for a utility vehicle, by means of which the axes may be lifted more effectively.

This object is achieved by an axle lifting device for a vehicle, in particular for vehicle axles with pneumatic suspension, according to claim 1, and by a wheel suspension for a vehicle, in particular for a utility vehicle, according to claim 13. Preferred embodiments are the subject matter of the dependent subclaims.

According to the invention, an axle lifting device for a vehicle, in particular for vehicle axles with pneumatic suspension, is provided which comprises a supporting element, a lifting element, and a lever element, the supporting element and the lever element being connectable to one another via the lifting element such that when the lifting element is actuated, the supporting element is supported on a frame element of the vehicle and the lever element exerts a preferably vertical force on an axle control arm of the vehicle in order to lift the axle control arm, and the lever element is mounted essentially in a stationary manner so as to be rotatable or pivotable with respect to a distal end of the axle control arm and/or the frame element, and the supporting element is rotatably or pivotably supported on the lever element.

The axle lifting device is preferably designed in such a way that it may be retrofitted on a vehicle axle, i.e., provided on an existing system, without having to substantially modify the existing system. Thus, the axle lifting device preferably has a modular design, i.e., a design that is independent of vehicle-specific components. The lever element is mounted essentially in a stationary manner so as to be rotatable or pivotable with respect to a distal end of the axle control arm and/or the frame element. In other words, the lever element is preferably mounted on the frame element so as to be rotatable or pivotable via an axis. This axis may advantageously coincide with the swivel axis of the axle control arm via which the axle control arm is rotatably or pivotably mounted on the frame element. Thus, the axle control arm and the lever element may be stationarily fixed to the frame element via the same axis. It is understood, however, that the axis of the lever element and the axis of the axle control arm may also be differently positioned, i.e., at a distance from the frame element. The supporting element is rotatably or pivotably mounted on the lever element. The supporting element is thus connected to the lever element via only one rotational or swivel axis, so that the supporting element is pivotable relative to the lever element. Swiveling or rotation of the supporting element in one direction is advantageously limited by the lifting element. Swiveling or rotation of the supporting element in the other direction is limited by an indirect (i.e., limited by at least one lever member that is intermediately connected or supported, i.e., situated therebetween) or a direct stop on the frame element of the vehicle. As a result, the supporting element and the lever element may be connected to one another via the lifting element in such a way that when the lifting element is actuated the supporting element tends to swivel away from the lever element and to be supported on a frame element of the vehicle. Further substantial motion of the supporting element in this direction is prevented by the support on the frame element, so that the motion produced by the lifting element is essentially realized solely by the lever element. As a result, the lever element exerts a preferably vertical force on an axle control arm of the vehicle in order to lift the axle control arm. It is understood that the geometric configuration of the lever element, or the geometric configuration or positioning of the supporting element and/or the lifting element, may be designed such that the lever element exerts a vertical force or another given force direction on the axle control arm. Since the supporting element is supported solely on the lever element in a stationary but rotatable manner, this results in an essentially floating suspension of the supporting element with respect to the frame element, since the lever element is essentially freely movable until it reaches the stop on the frame element as long as the lifting element is not actuated. In other words, a rotation of the supporting element relative to the lever element and a rotation of the lever element about its bearing point on the frame element during actuation of the lifting element causes a change in position of each area of the supporting element with respect to the frame element.

The supporting element preferably has a supporting element bearing region on which the supporting element is rotatably or pivotably mounted on the lever element via a first lever element bearing region. The connection between the supporting element and lever element via the supporting element bearing region, i.e., the first lever element bearing region, may be provided by means of a shaft or axle, for example, which passes through the supporting and lever elements. Alternatively, any other connection between the lever element and supporting element may be provided which allows rotation or swiveling between the lever element and the supporting element.

The supporting element preferably has a supporting element stop region which may be brought into contact with the frame element of the vehicle in order to be supported against same. The supporting element stop region is advantageously provided to furnish a support on the frame element when a force is exerted on the supporting element via the lifting element. This force causes the supporting element to swivel to the point at which the supporting element essentially comes into contact with the frame element via the supporting element stop region and is thus supported on the frame element. The supporting element stop region may have any given configuration, but is advantageously designed so that a relative motion of the supporting element stop region on the frame element is ensured and/or allowed. This may be a sliding or rolling motion.

The lever element also preferably has a second lever element bearing region, by means of which the lever element is connected to the distal end of the axle control arm and/or to the frame element. The lever element may thus be directly attached in a rotatable or pivotable manner to the axle control arm via the second lever element bearing region, this preferably being achieved on a distal end of the axle control arm. Alternatively, the lever element may likewise be rotatably or pivotably mounted on a frame element, independent of the axle control arm, via the second lever element bearing region. In one preferred embodiment the lever element and the axle control arm may also be fastened to the frame element via a common axis.

The first lever element bearing region and the second lever element bearing region are preferably separated at a distance from one another. In other words, the rotational axis of the first lever element bearing region does not coincide with the rotational axis of the second lever element bearing region. Such a configuration of the first lever element bearing region and the second lever element bearing region ensures that when the lifting element is actuated, thereby causing relative motion of the supporting element and lever element, the first lever element bearing region rotates with respect to the second lever element bearing region and thus changes its position. The change in position of the first lever element bearing region causes the supporting element bearing region to shift, thereby changing the lever between the supporting element bearing region and the supporting element stop region. This achieves an amplifying or servo effect which results in a power boost on the axle control arm. In this manner the supporting element, which is supported at a region at a distance from a second lever element bearing region (supporting element bearing region or first lever element bearing region) on the lever element, produces additional leverage by support on the supporting element stop region, thereby exerting additional force for lifting the axle.

In addition, the second lever element bearing region is advantageously situated between the first lever element bearing region and a stop region for the lever element which may be brought into contact with an axle control arm. This ensures an advantageous power boost (servo effect) when the lifting element is actuated.

The lifting element advantageously has a first and a second operative end, whereby the first operative end is held by the supporting element, and the second operative end contacts or may be brought into contact with a second stop region for the lever element. It is understood that the second operative end is connected to the second stop region for the lever element; i.e., the second operative end is fixedly mounted to the lever element. Actuation of the lifting element thus moves the second stop region for the lever element at a distance from the first operative end of the lifting element, i.e., the part of the supporting element adjacent thereto, and the lever element and the supporting element, supported by the supporting element bearing region, i.e., the first lever element bearing region, rotate away from one another. Actuation of the lifting element thus causes a relative motion in opposite directions between the region of the supporting element, to which the lever element is mounted, and a second stop region for the lever element.

The lifting element is also preferably designed as a gas bellows and/or membrane cylinder. The lifting element may also be any other given, preferably mechanical, device, on whose two regions an essentially opposite motion may be provided.

The supporting element stop region is advantageously designed to roll or slide along a rolling or sliding region of the frame element when the lifting element is actuated.

The supporting element stop region is advantageously designed as a roller element, preferably as a roller. Thus, very little friction is produced between the supporting element stop region and the frame element or the rolling or sliding region thereof during actuation of the lifting element, so that the axle lifting device has a very high efficiency. It is understood that the supporting element stop region may likewise be designed as a sliding element or sliding region to allow sliding along the corresponding region of the frame element during actuation of the lifting element. Slidable material joints are preferably provided for this purpose.

It is also advantageous for the supporting element stop region to essentially have the geometric configuration of an involute which is designed to roll on a correspondingly designed rolling area of the frame element when the lifting element is actuated. The involute may have a geometric (surface) configuration known from gear wheel technology. Such an involute contact has the advantage that the contact surfaces are always in contact during activation or actuation of the lifting element and have approximately the same speed in these contact points, so that there is no relative motion between the elements in the contact points, thereby ensuring essentially low-friction transmission of force.

The lever element preferably is designed in such a way that the first lever element bearing region and the first and second stop regions essentially form a triangular configuration, the second lever element bearing region preferably being situated essentially along the side region extending between the first lever element bearing region and the first stop region. Thus, viewed in the direction of the vehicle axle, the lever element has an essentially triangular shape. In other words, the "first lever element bearing region," "first stop region," and "second stop region" define a triangle. In such a configuration the second lever element bearing region is preferably provided along a straight line extending between the first stop region and the first lever element bearing region, whereby the second lever element bearing region is provided between the first lever element bearing region and the first stop region to produce the servo effect. Such a design of the lever element achieves an efficient servo effect for the axle lifting device, and the axle lifting device may be modified to various spatial situations of the vehicle axles by a corresponding adaptation of the geometry of the lever element (size of the triangle).

In addition, according to the invention a wheel suspension for a vehicle, in particular for a utility vehicle, is provided with an axle lifting device, comprising an axle control arm which supports at least one axle tube of a vehicle axle and which on at least one end is rotatably or pivotably supported on a frame element of the vehicle; and a supporting element, a lifting element, and a lever element, whereby the supporting element and the lever element are connectable to one another via the lifting element such that when the lifting element is actuated, the supporting element is supported on the frame element of the vehicle and the lever element exerts a preferably vertical force on the axle control arm of the vehicle in order to lift the axle control arm, and the lever element is mounted essentially in a stationary manner so as to be rotatable or pivotable with respect to the end of the axle control arm and/or the frame element, and the supporting element is rotatably or pivotably supported on the lever element.

The axle lifting device is preferably designed in such a way that it may be retrofitted on a vehicle axle or the axle control arm, i.e., provided on an existing system, without having to substantially modify the existing system. Thus, the axle lifting device preferably has a modular design, i.e., a design that is independent of vehicle-specific components. The lever element is mounted essentially in a stationary manner so as to be rotatable or pivotable with respect to a distal end of the axle control arm and/or the frame element. In other words, the lever element is preferably mounted on the frame element so as to be rotatable or pivotable via an axis. This axis may advantageously coincide with the swivel axis of the axle control arm via which the axle control arm is rotatably or pivotably mounted on the frame element. Thus, the axle control arm and the lever element may be stationarily fixed to the frame element via the same axis. It is understood, however, that the axis of the lever element and the axis of the axle control arm may also be differently positioned, i.e., at a distance from the frame element. The supporting element is rotatably or pivotably mounted on the lever element. The supporting element is thus connected to the lever element via only one rotational or swivel axis, so that the supporting element is pivotable relative to the lever element. Swiveling or rotation of the supporting element in one direction is advantageously limited by the lifting element. Swiveling or rotation of the supporting element in the other direction is limited by a stop on the frame element of the vehicle. As a result, the supporting element and the lever element may be connected to one another via the lifting element in such a way that when the lifting element is actuated, the supporting element tends to swivel away from the lever element and to be supported on a frame element of the vehicle. Further substantial motion of the supporting plane in this direction is prevented by the support on the frame element, so that the motion produced by the lifting element is essentially realized solely by the lever element. As a result, the lever element exerts a preferably vertical force on an axle control arm of the vehicle in order to lift the axle control arm. It is understood that the geometric configuration of the lever element, or the geometric configuration or positioning of the supporting element and/or the lifting element, may be designed such that the lever element exerts a vertical force on the axle control arm or another given force direction. Since the supporting element is supported solely on the lifting element in a stationary but rotatable manner, this results in an essentially floating suspension of the supporting element with respect to the frame element, since the lifting element is essentially freely movable until it reaches the stop on the frame element as long as the lifting element is not actuated. In other words, a rotation of the supporting element relative to the lever element and a rotation of the lever element about its bearing point on the frame element during actuation of the lifting element causes a change in position of each area of the supporting element with respect to the frame element.

It is understood that all further features and advantages of the axle lifting device according to the invention may similarly find application for the wheel suspension according to the invention, and may thus be incorporated into the wheel suspension according to the invention.

Further advantages and features of the invention are described below by way of example, with reference to an accompanying drawing of one preferred embodiment. The drawing shows the following.

Figure 1:
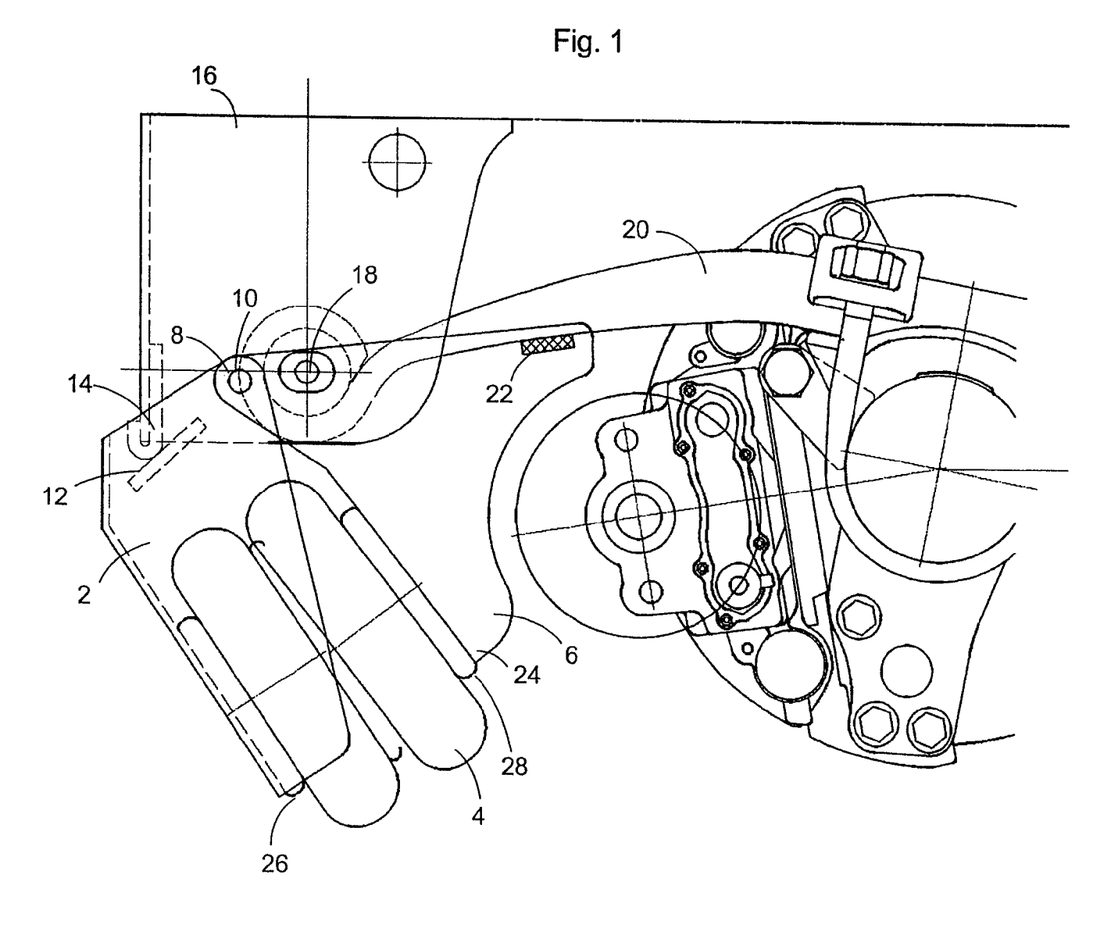
FIG. 1 shows a schematic side view of a preferred embodiment of the axle lifting device according to the invention.

The embodiment of the axle lifting device according to the invention illustrated in FIG. 1 comprises a supporting element 2, a lifting element 4, and a lever element 6.

The supporting element 2 is mounted on a first lever element bearing region 10 of the lever element 6 via a supporting element bearing region 8. The connection between the supporting element bearing region 8 and the first lever element bearing region 10 is designed such that swiveling or rotation between the lever element 6 and the supporting element 2 is allowed. The supporting element 2 also has a supporting element stop region 12 which a supporting, corresponding rolling or sliding region 14 on the frame element 16 of a vehicle contacts or is able to contact. The supporting element stop region 12 and the rolling or sliding region 14 may cooperate as a result of their geometric configuration, so that the lowest possible frictional resistance is produced when the supporting element 2 is moved.

In addition to the first lever element bearing region 10, the lever element 6 also has a second lever element bearing region 18 on which the lever element 6 together with the frame element 16 and/or a preferably distal end region of an axle control arm or wheel suspension control arm or longitudinal control arm 20 of a vehicle is rotatably or pivotably attached or mounted. The lever element 6 is thus able to rotate about the second lever element bearing region 18. Lastly, the lever element 6 has a first stop region 22 which may be brought into contact or engagement with a region of the axle control arm 20, separated at a distance from the center of rotation of the axle control arm 20, in order to rotate the axle control arm 20 about its swivel axis. The force transmitted via the first stop region 22 to the axle control arm 20 is conveyed via the lifting element 4 to a second stop region 24 of the lever element 6, whereby the second stop region 24 of the lever element 6 may be brought into contact or engagement with the lifting element 4 when the lifting element 4 is actuated.

The lifting element 4 has a first operative end 26 and a second operative end 28. The first operative end 26 of the lifting element 4 is held by the supporting element 2. In other words, the lifting element 4 is fixedly connected to the supporting element 2. The second operative end 28 may be brought into contact with the second stop region 24 of the lever element 6. However, the second operative end 28 of the lifting element 4 may also be in continuous contact with or be fixedly connected to the second stop region 24 of the lever element 6. When the lifting element 4 is actuated, the first operative end 26 and the second operative end 28 are separated at a distance from one another. This causes a rotation of the supporting element 2 and the lever element 6 away from one another, i.e., in opposite directions, about the common bearing region, i.e., the supporting element bearing region 8, and the first lever element bearing region 10. The supporting element stop region 12 of the supporting element 2 is thus brought into contact with the frame element 6 or the rolling or sliding region 14 thereof in order to absorb the force acting in the supporting element 2. Due to the stop for the supporting element stop region 12 on the frame element 16, when the lifting element is further actuated a force or motion is transmitted via the first stop region 22 of the lever element 6 to the axle control arm 20, thereby lifting same. As a result of the distance between the first lever element bearing region 10 and the second lever element bearing region 18, rotation of the lever element 6 causes a change in the position of the first lever element bearing region 10, thereby changing the leverage in such a way that a power boosting effect or servo effect is advantageously provided. In this manner it is advantageously possible to provide an axle lifting device in a compact design which is able to apply a high force and thus lift heavy vehicle axles, i.e., by means of which a lifting element that is small in size and/or power may be used for the same lifting power.

Figure 2:
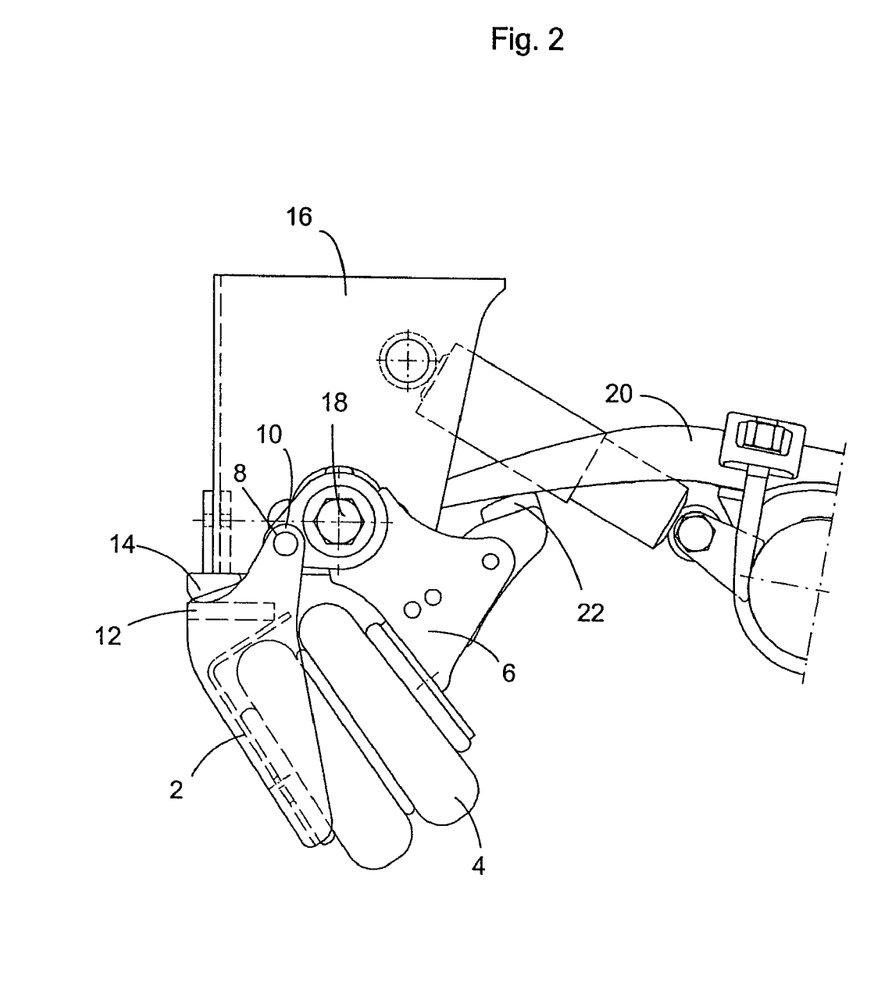
FIG. 2 shows a schematic side view of a further preferred embodiment of the axle lifting device according to the invention.

The contact region between the supporting element stop region 12 and the rolling or sliding region 14 may have various geometric embodiments. Thus, for example, as illustrated in FIG. 2, the rolling/sliding region 14 and/or the supporting element stop region 12 have essentially the geometric configuration of an involute, thus allowing rolling of the two surfaces with respect to one another during motion of the supporting element 2. This ensures little or no frictional resistance. It is understood that on the one hand, as illustrated, only the rolling/sliding region 14 may have the essentially geometric configuration of an involute, and on the other hand that alternatively or additionally the supporting element stop region 12 may also have the essentially geometric configuration of an involute, at least in places. In this manner the efficiency of the axle lifting device is increased several times.

Figure 3:
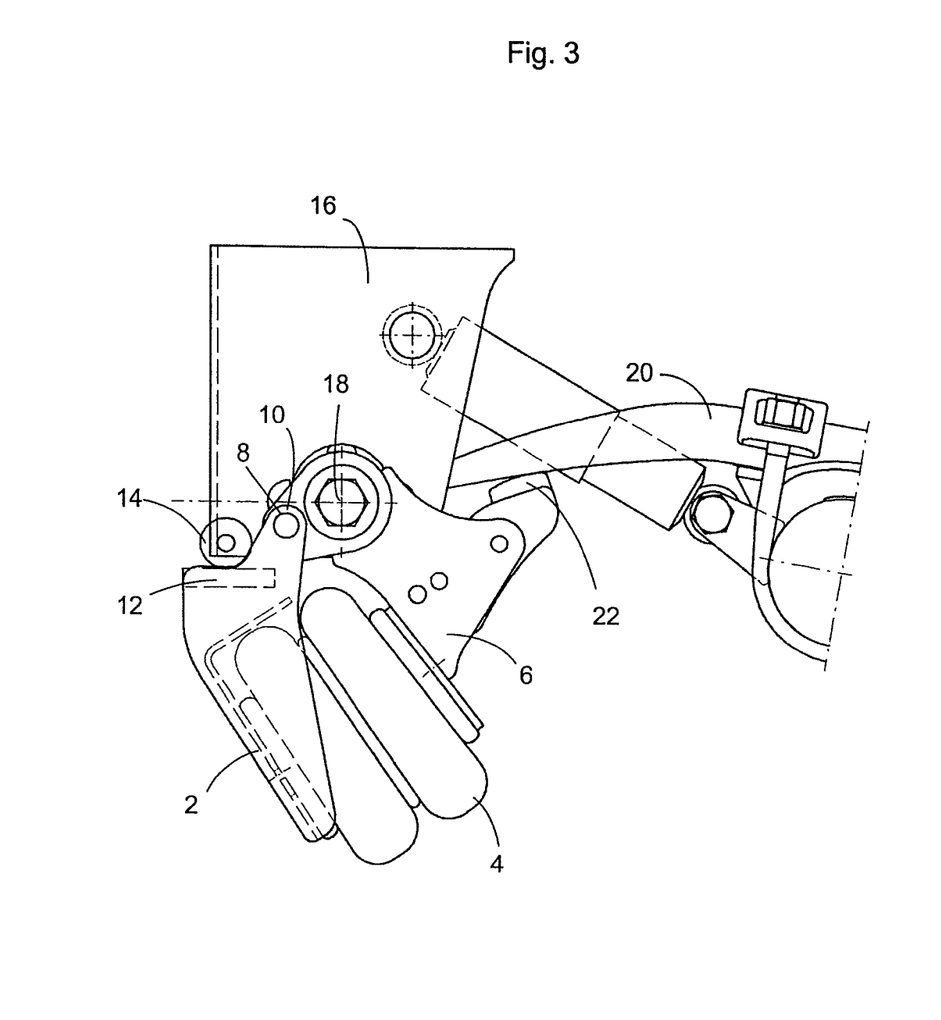
FIG. 3 shows a schematic side view of a further preferred embodiment of the axle lifting device according to the invention.

As shown in the further embodiment of the axle lifting device according to the invention illustrated in FIG. 3, the supporting element stop region 12 may have an essentially plate-shaped design, whereby the rolling/sliding region 14 is designed as a rotational element, for example a roller or cylinder, thereby allowing rolling essentially without frictional resistance during motion of the supporting element 2.

Figure 4:
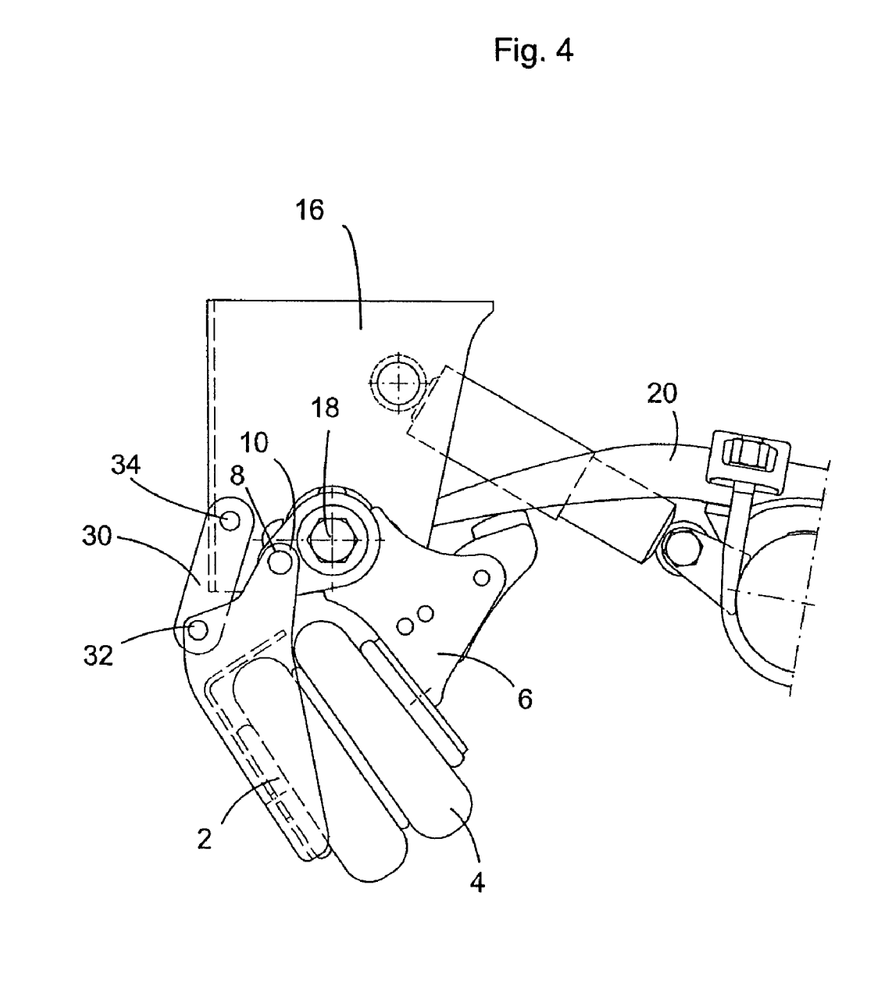
FIG. 4 shows a schematic side view of a further preferred embodiment of the axle lifting device according to the invention.

FIG. 4 illustrates an embodiment of the axle lifting device according to the invention in which the supporting element 2 is indirectly supported on the frame element 16 of the vehicle via a lever member 30. This essentially results in the configuration of a toggle lever. The lever member 30 has an articulated or pivotable or rotatable connection to the supporting element 2 via a first lever member bearing region 32. The first lever member bearing region 32 is mounted on the supporting element 2 in such a way that the former is advantageously separated at a distance from the supporting element bearing region 8 and from the region of the supporting element 2 on which the lifting element 4 is mounted. The supporting element bearing region 8, the first lever member bearing region 32 on the supporting element 2, and the region of the supporting element 2 on which the lifting element 4 is mounted, preferably essentially form the geometric shape of a triangle. In addition, the lever member 30 is mounted on the frame element 16 of the vehicle in an articulated or pivotable or rotatable manner via a second lever member bearing region 34. When the lifting element 4 is actuated and the supporting element 2 and lever element 6 are correspondingly moved or rotated by the lever member 30, this results in an improved servo effect, thereby increasing the effectiveness of the axle lifting device.

LIST OF REFERENCE NUMERALS

2 Supporting element
4 Lifting element
6 Lever element
8 Supporting element bearing region
10 First lever element bearing region
12 Supporting element stop region
14 Rolling or sliding region
16 Frame element
18 Second lever element bearing region
20 Axle control arm
22 First stop region
24 Second stop region
26 First operative end
28 Second operative end
30 Lever member 32 First lever member bearing region
34 Second lever member bearing region

The invention claimed is:

1. An axle lifting device for a vehicle, in particular for vehicle axles with pneumatic suspension, comprising:
   a supporting element, a lifting element, and a lever element,
   the supporting element and the lever element being connectable to one another via the lifting element such that when the lifting element is actuated, the supporting element is supported on a frame element of the vehicle and the lever element exerts a preferably vertical force on an axle control arm of the vehicle in order to lift the axle control arm,
   and the lever element is mounted essentially in a stationary manner so as to be rotatable or pivotable with respect to a distal end of the axle control arm and/or the frame element,
   and the supporting element is rotatably or pivotably supported on the lever element.

2. The axle lifting device according to claim 1, wherein the supporting element has a supporting element bearing region that is rotatably or pivotably mounted on the lever element via a first lever element bearing region.

3. The axle lifting device according to claim 1, wherein the supporting element has a supporting element stop region which may be brought into contact with the frame element of the vehicle in order to be supported against same.

4. The axle lifting device according to claim 2, wherein the lever element has a second lever element bearing region, by means of which the lever element is connected to the distal end of the axle control arm and/or to the frame element.

5. The axle lifting device according to claim 4, wherein the first lever element bearing region and the second lever element bearing region are separated at a distance from one another.

6. The axle lifting device according to claim 5, wherein the second lever element bearing region is situated between the first lever element bearing region and a first stop region of the lever element which may be brought into contact with an axle control arm.

7. The axle lifting device accordingly to claim 1, wherein the lifting element has a first and a second operative end, whereby the first operative end is held by the supporting element, and the second operative end contacts or may be brought into contact with a second stop region for the lever element.

8. The axle lifting device according to claim 1, wherein the lifting element is designed as a gas bellows and/or membrane cylinder.

9. The axle lifting device according to claim 3, wherein the supporting element region is designed to roll or slide along a rolling or sliding region of the frame element when the lifting element is actuated.

10. The axle lifting device according to claim 3, wherein the supporting element stop region is designed as a roller element, preferably as a roller.

11. The axle lifting device according to claim 3, wherein the supporting element stop region essentially has the geometric configuration of an involute which is designed to roll on a correspondingly designed rolling area of the frame element when the lifting element is actuated.

12. The axle lifting device according to claim 2, wherein the lever element includes a first lever element is designed in such a way that the first lever element bearing region and, further including:

a first stop region and a second stop region that may each be brought into contact with the frame element, wherein the first and second stop regions essentially form a triangular configuration; and a second lever element bearing region that is preferably situated essentially along a side region extending between the first lever element bearing region and the first stop region.

13. Wheel suspension for a vehicle, in particular for a utility vehicle, having an axle lifting device comprising an axle control arm which supports at least one axle tube of a vehicle axle and which on at least one end is rotatably or pivotably supported on a frame element of the vehicle; and a supporting element, a lifting element, and a lever element, whereby the supporting element and the lever element are connectable to one another via the lifting element such that when the lifting element is actuated, the supporting element is supported on the frame element of the vehicle and the lever element exerts a preferably vertical force on the axle control arm of the vehicle in order to lift the axle control arm, and the lever element is mounted essentially in a stationary manner so as to be rotatable or pivotable with respect to the end of the axle control arm and/or the frame element, and the supporting element is rotatably or pivotably supported on the lever element.

* * * * *